June 4, 1963
C. R. MURPHY
3,092,667
PROCESS FOR THE RECOVERY OF METHANOL
Filed Oct. 9, 1959
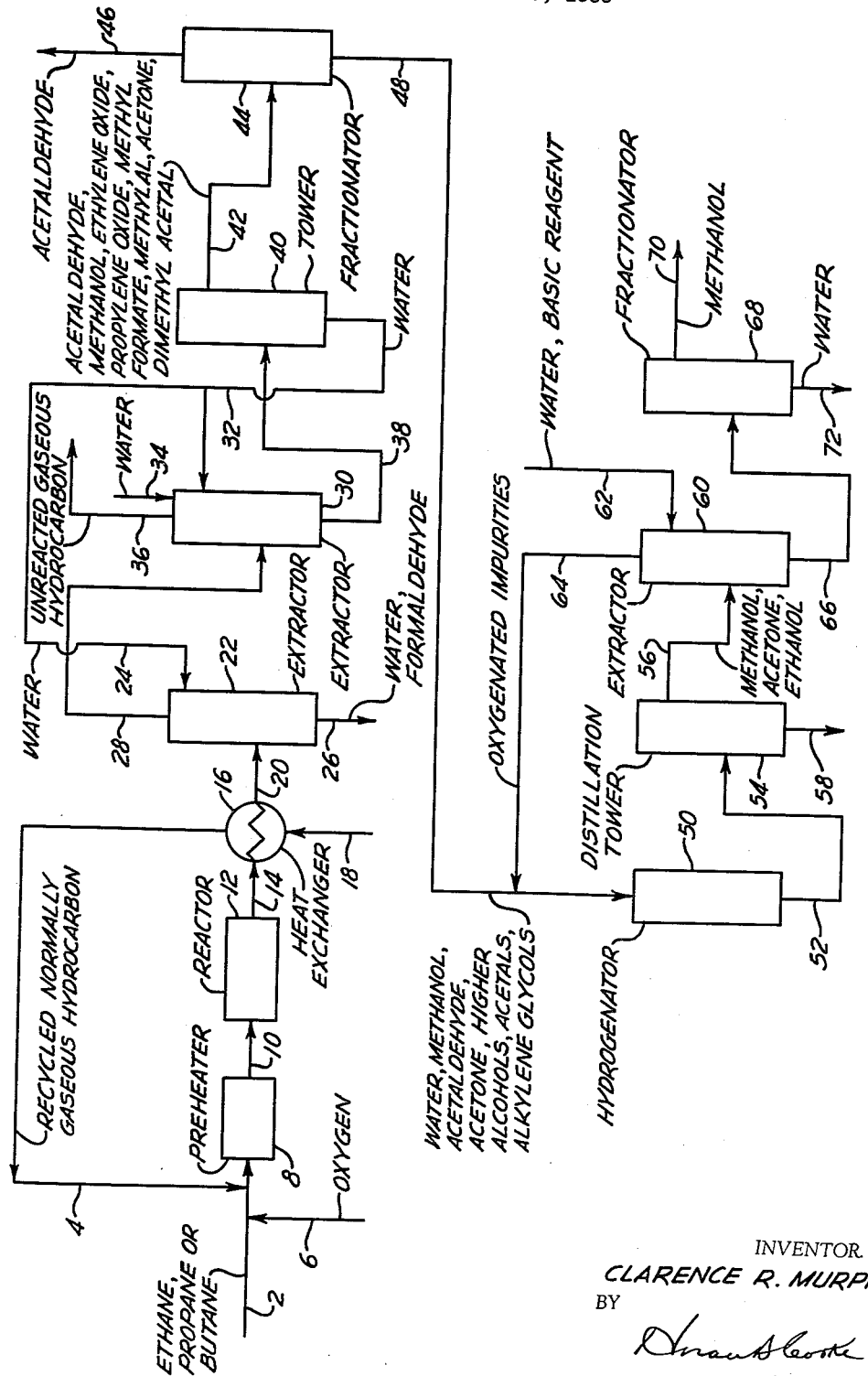
INVENTOR.
CLARENCE R. MURPHY
BY
ATTORNEY United States Patent Office 3,092,667
Patented June 4, 1963

3,092,667
PROCESS FOR THE RECOVERY OF METHANOL
Clarence R. Murphy, Allison Park, Pa., assignor to Gulf Research & Development Company, Pittsburgh, Pa., a corporation of Delaware
Filed Oct. 9, 1959, Ser. No. 845,459
2 Claims. (Cl. 260—632)

This invention relates to a process for obtaining methanol and more particularly to a process for recovering methanol obtained as a result of the partial oxidation of normally gaseous hydrocarbons such as propane.

The partial oxidation of normally gaseous hydrocarbons results in an oxygenated mixture comprising formaldehyde, acetaldehyde, methanol, higher alcohols such as ethanol, propanol, butanol, etc., acetone, acetals and ethylene and propylene oxides. Formaldehyde and subsequently acetaldehyde can be removed from the oxygenated mixture. Methanol can then be recovered from the remainder of the oxygenated mixture. Recovery of pure methanol from said remainder is complicated, however, since many of the impurities which are also produced in the partial oxidation reaction and which are naturally admixed therewith, for example, dimethyl acetal, acetone, higher acetals, etc., boil very close to methanol or form azeotropes therewith.

I have found that the recovery of pure methanol from an oxidation mixture such as that described above can be facilitated by a process which comprises separating formaldehyde and acetaldehyde from an oxygenated mixture obtained as a result of the partial oxidation of normally gaseous hydrocarbons, subjecting the remaining mixture to hydrogenation conditions to obtain a hydrogenated mixture containing no more than about 5, preferably containing no more than about 3 percent by weight of carbonyl-containing compounds, separating from said hydrogenated mixture a mixture comprising methanol and carbonyl-containing compounds, said mixture having a boiling point below about 160° to about 170° F., extracting said latter mixture containing methanol and said latter carbonyl-containing compounds with water, and thereafter recovering methanol from said extract.

The present invention can further be illustrated by reference to the accompanying flow diagram which is hereby incorporated in the present specification.

Referring to the flow diagram, a normally gaseous hydrocarbon such as ethane, propane or butane, is introduced into the system by line 2, recycled normally gaseous hydrocarbon by line 4 and oxygen by line 6. The resultant mixture is generally at a temperature of about 550° to about 600° F. and a pressure of about 100 to about 150 pounds per square inch gauge. The resultant mixture will contain about 70 to about 80 volume percent of normally gaseous hydrocarbons, about 2 to about 4 volume percent of oxygen, the remainder being gases inert to the desired oxidation reaction, such as carbon monoxide, carbon dioxide, etc.

The resultant mixture is charged to preheater 8 wherein said mixture in about 0.1 to about 0.2 second is raised to a temperature of about 600° to about 750° F. and a pressure of about 100 to about 150 pounds per square inch gauge. The heated mixture is removed from preheater 8 by line 10 and passed to reactor 12 wherein the mixture is reacted at a temperature of about 700° to about 900° F. and a pressure of about 100 to about 150 pounds per square inch gauge for about 0.1 to about 2.0 seconds. The partial oxidation product obtained in oxidation reactor 12 is removed therefrom by line 14 and within about 0.1 to about 2.0 seconds is cooled to a temperature of about 300° to about 400° F. and a pressure of about 100 to about 150 pounds per square inch gauge by any suitable means, for example by passage through heat exchanger 16 in indirect relationship with recycle hydrocarbon gas passing therethrough from line 18 on its way to line 4.

From heat exchanger 16 the partial oxidation product, including unoxidized gaseous hydrocarbon, is passed by line 20 to extractor 22 which is maintained at a temperature of about 120° to about 220° F. and a pressure of about 100 to about 150 pounds per square inch gauge. Water is introduced therein by line 24. Water containing the absorbed formaldehyde is removed from the base of extractor 22 by line 26 and passed to suitable recovery means to obtain the desired formaldehyde. The remainder of the product is removed overhead from extractor 22 by line 28 and passed to extractor 30 which is maintained at a temperature of about 85° to about 120° F. and a pressure of about 100 to about 150 pounds per square inch gauge. Recycled water containing some absorbed formaldehyde is introduced into extractor 30 by line 32, a portion of which forms the supply for line 24, and fresh make-up water by line 34. Unreacted gaseous hydrocarbon is removed overhead from extractor 30 by line 36 and can be recycled directly, or after any suitable treatment, to line 18.

The product removed from the base of extractor 30 is passed by line 38 to tower 40 which can be maintained at a top temperature of about 150° to about 250° F. and a pressure of about 0 to about 30 pounds per square inch gauge. Water containing some absorbed formaldehyde is removed from the base of tower 40 by line 32 and recycled by the designated lines to extractors 22 and 30.

The total product remaining, including acetaldehyde, methanol, ethylene and propylene oxides, methyl formate, methylal, acetone, dimethyl acetal, etc., is removed from tower 40 by line 42. If desired, any methanol which may be present in line 26 can be separated therefrom and also introduced into line 42. The resulting mixture, preferably after treatment with an ion exchange resin for the purpose of converting said olefin oxides to the corresponding glycols, is passed to fractionation tower 44 which is maintained at a top temperature of about 125° to about 135° F. and a pressure of about 30 to about 40 pounds per square inch gauge. As a result thereof purified acetaldehyde is removed from tower 44 by line 46. The remainder of the product, issuing from the base of tower 44, by line 48, typically, can have the following composition:

| Compound: | Percent by weight |
| --- | --- |
| Water | 5 to 10 |
| Methanol | 50 to 70 |
| Acetaldehyde and acetone | 1 to 10 |
| Ethanol | 1 to 15 |
| Isopropanol | 4 to 10 |
| n-Propanol | 1 to 5 |
| Butanols | 1 to 5 |
| Miscellaneous acetals | 1 to 5 |
| Dimethyl acetals | 2 to 7 |
| Ethylene and propylene glycols | 1 to 10 |

The product in line 48 is then introduced into hydrogenator 50 which is packed with a hydrogenation catalyst such as nickel, copper, chromia, etc., and maintained at a temperature of about 300° to about 350° F. and a pressure of about 600 to about 1000 pounds per square inch gauge. The oxygenated product as well as sufficient hydrogen is passed through hydrogenation reactor 50 at a space velocity, volume of product per volume of catalyst per hour, of about 0.25 to about 1.5. As a result of such treatment, a substantial amount of the aldehydes present, formaldehyde, acetaldehyde, propionaldehyde, and acrolein; ketones, acetone and methylethylketone; and acetals, methylal and acetaldehyde dimethyl acetal, are hydrogenated to the corresponding alcohols. As previously noted, it is critical in the practice of the present invention that the weight percent of carbonyl-containing compounds, on a water-free basis, in the hydrogenated product be no more than about 5, preferably no more than about 3 percent by weight. A typical hydrogenated product will have the following composition:

| Compound: | Percent by weight |
| --- | --- |
| Methanol | 55 to 75 |
| Acetaldehyde and acetone | 0 to 0.5 |
| Dimethylacetal | 0 to 0.5 |
| Ethanol | 8 to 15 |
| Isopropanol | 3 to 10 |
| n-Propanol | 2 to 6 |
| Butanol | 1 to 5 |
| Miscellaneous acetals | 1 to 2 |
| Water | 8 to 10 |
| Ethylene and propylene glycol | 1 to 10 |

From hydrogenator 50 the hydrogenated product is passed by line 52 to distillation tower 54 wherein methanol and carbonyl-containing compounds boiling up to about 160° to about 170° F. are separated therefrom. This can be done by maintaining a top temperature in distillation tower 54 of about 160° to about 170° F. and a pressure of about 0 to about 5 pounds per square inch gauge. As a result of such treatment a mixture containing methanol, acetone, ethanol, etc., is removed from distillation tower 54 by line 56. The remainder of the oxygenated product is removed from the base of distillation tower 54 by line 58 for further treatment as desired.

The product in line 56 is passed to extractor 60 wherein it is subjected to extractive distillation conditions for the purpose of removing therefrom the low-boiling carbonyl-containing compounds or other impurities admixed therewith. This is done by maintaining in extractor 60 a temperature of about 170° to about 200° F. and a pressure of about 0 to about 5 pounds per square inch gauge while introducing therein by line 62 about one to about 5 percent by weight of water based on the product introduced therein by line 56. In order to polymerize aldehydes which may be present and stabilize the acetals which are present, the water in line 62 can contain about 0.1 to about 2.0 percent by weight of a basic reagent such as sodium hydroxide, calcium hydroxide, potassium hydroxide, etc. As a result thereof, the oxygenated impurities are removed overhead by line 64 and are preferably recycled to hydrogenator 50. The product which is removed from the base of extractor 60 by line 66 is passed to fractionator 68 which is maintained at a top temperature of about 147° to about 150° F. and a pressure of about 0 to about 5 pounds per square inch gauge. Under such conditions methanol having a purity of 99.95 percent by weight is removed from fractionator 68 by line 70. The remainder of the product therein, water, containing the basic reagent when used, is removed from the base thereof by line 72.

The invention can further be illustrated by reference to the following examples. Example I, which was not operated in accordance with my invention, clearly shows the disadvantage of attempting to recover methanol without first separating from the hydrogenated mixture materials boiling above about 160° to about 170° F.

EXAMPLE I

In the present example, as well as the following examples, the charge to the hydrogenation reactor, which was obtained as a result of the partial oxidation of propane and from which subtantially all of the formaldehyde and acetaldehyde had been removed, had the following analysis:

Table I

| Compound: | Percent by weight |
| --- | --- |
| Methanol | 60 |
| Acetaldehyde | 3 |
| Acetone | 5 |
| Normal propanol | 2 |
| Isopropanol | 3 |
| Butanol | 1 |
| Ethanol | 7 |
| Dimethylacetal | 5 |
| Miscellaneous acetals | 5 |
| Water | 9 |

This charge, containing 21.8 percent by weight of carbonyl-containing compound on a water-free basis, was passed through a hydrogenation reactor containing a nickel catalyst at a temperature of 350° F., a pressure of 600 pounds per square inch gauge and a liquid hourly space velocity of about one. The hydrogenated product was found to contain 2.9 percent by weight, on a water-free basis, of carbonyl-containing compounds. The hydrogenated product was charged to a water extractor with a weight ratio of water to feed of 2.5:1 and a top temperature of 170° to 200° F. and a pressure of 0 pounds per square inch gauge. The water contained 1.0 percent by weight of sodium hydroxide. The bottoms product from the first extractor was sent to a second extractor operated under the same conditions as the first extractor. In each case, the non-polar contaminants coming off overhead were recycled to the hydrogenation reactor. The bottoms from the second extractor was sent to a 60-plate distillation column run at 10:1 reflux ratio, with a top temperature of 148° F. and a pressure of 0 pounds per square inch gauge, where the methanol was removed as an overhead product and the remainder, chiefly higher alcohols, as a bottoms product. The methanol was unable to pass the standard permanganate test (ASTM Test No. D268–53). In addition, there was a 10 percent loss of methanol with the water as a bottoms product.

Operation in accordance with the present invention is illustrated below in Example II.

EXAMPLE II

The same charge employed in Example I was hydrogenated under the same conditions until a hydrogenated product containing 3.65 percent by weight of carbonyl-containing compounds was obtained. This product was sent to a 60-plate distillation column having a top temperature of 155° F. and a pressure of 0 pounds per square inch gauge. Methanol and light carbonyl-containing impurities were removed from the top of the column, and the remainder, comprising water and higher alcohols were removed from the base thereof. The product from the top of the distillation column was sent to a water extractor with a weight ratio of water to feed of 2.5:1 wherein the top temperature was 185° F. and the pressure 0 pounds per square inch gauge. The water contained one percent by weight of sodium hydroxide. The low-boiling impurities which were removed from the top of the water extractor were recycled to the hydrogenation zone, while the remainder of the product was sent to fractionating tower containing 60 plates and operated at a top temperature of 148° F. and a pressure of 0 pounds per square inch gauge with a reflux ratio of 7:1. Methanol free of carbonyl-containing compounds was obtained as an overhead product. This methanol passed the standard permanganate test referred to above with a two hour time. Only 3 percent by weight of methanol was lost with the bottoms product.

That it is imperative that the amount of carbonyl-containing compounds must be within the defined range after hydrogenation and prior to further treatment is apparent from Example III below.

EXAMPLE III

In this run the procedure employed was identical to that of Example II except that the product after hydrogenation was found to contain 6.45 percent by weight of carbonyl-containing compounds. The methanol recovered failed to pass the standard permanganate test referred to above. Three percent by weight of methanol was lost.

Obviously, many modifications and variations of the invention as hereinabove set forth, can be made without departing from the spirit and scope thereof, and therefore only such limitations should be imposed as are indicated in the appended claims.

I claim:

1. A process for obtaining methanol which comprises oxidizing a gas selected from the group consisting of ethane, propane and butane with a gas containing molecular oxygen at a temperature of about 700° to about 900° F. to obtain an oxygenated mixture containing essentially formaldehyde, acetaldehyde, methanol, higher alcohols, acetone, acetals and ethylene and propylene oxides, removing formaldehyde by extraction with water and a portion of the acetaldehyde by fractionation from the oxygenated mixture and obtaining an oxygenated product containing in excess of about five percent by weight thereof of carbonyl-containing compounds consisting of acetaldehyde, acetone and acetals, directly subjecting said latter oxygenated product to hydrogenation with hydrogen in the presence of a hydrogenation catalyst at a temperature of about 300° to about 350° F. to obtain a hydrogenation product containing from about one to about three percent by weight of carbonyl-containing compounds, distilling from said hydrogenation product at a temperature of about 160° to about 170° F. a product consisting essentially of methanol and carbonyl-containing compounds, extracting said methanol product with water containing a basic reagent selected from the group consisting of sodium hydroxide, potassium hydroxide and calcium hydroxide and thereafter recovering by distillation at a temperature of about 147° to about 150° F. methanol from said extract.

2. A process for obtaining methanol which comprises oxidizing propane with a gas containing molecular oxygen at a temperature of about 700° to about 900° F. to obtain an oxygenated mixture containing essentially formaldehyde, acetaldehyde, methanol, higher alcohols, acetone, acetals and ethylene and propylene oxides, removing formaldehyde by extraction with water and a portion of the acetaldehyde by fractionation from the oxygenated mixture and obtaining an oxygenated product containing in excess of about five percent by weight thereof of carbonyl-containing compounds consisting of acetaldehyde, acetone and acetals, directly subjecting said latter oxygenated product to hydrogenation with hydrogen in the presence of a hydrogenation catalyst at a temperature of about 300° to about 350° F. to obtain a hydrogenation product containing from about one to about three percent by weight of carbonyl-containing compounds, distilling from said hydrogenation product at a temperature of about 160° to about 170° F. a product consisting essentially of methanol and carbonyl-containing compounds, extracting said methanol product with water containing sodium hydroxide and thereafter recovering by distillation at a temperature of about 147° to about 150° F. methanol from said extract.

References Cited in the file of this patent

UNITED STATES PATENTS

| | | |
|---|---|---|
| 2,115,553 | Giesen et al. | Apr. 26, 1938 |
| 2,151,461 | Britton et al. | Mar. 21, 1939 |
| 2,470,222 | Patterson | May 17, 1949 |
| 2,569,671 | Hughes et al. | Oct. 2, 1951 |
| 2,868,849 | Leach et al. | Jan. 13, 1959 |